United States Patent [19]

Koral et al.

[11] 4,390,459

[45] Jun. 28, 1983

[54] CONDUCTIVE MOLDING COMPOSITIONS COMPRISING VINYL CHLORIDE-VINYL ETHER COPOLYMERS

[75] Inventors: Marvin Koral, Warren; Donald Goodman, Flemington, both of N.J.

[73] Assignee: Tenneco Chemicals, Inc., Piscataway, N.J.

[21] Appl. No.: 298,832

[22] Filed: Sep. 2, 1981

[51] Int. Cl.³ .............................................. H01B 1/06
[52] U.S. Cl. .................................. 252/511; 524/495; 524/567
[58] Field of Search ................ 252/511; 524/495, 496, 524/567, 568; 523/174

[56] References Cited

U.S. PATENT DOCUMENTS 3,053,800  9/1962  Grabowski et al. ................ 252/511

*Primary Examiner*—J. L. Barr
*Attorney, Agent, or Firm*—Evelyn Berlow

[57] ABSTRACT

Conductive molding compositions comprise a vinyl chloride-vinyl ether copolymer that contains as comonomer a vinyl ether having the structural formula $$CH_2=CHOR$$

wherein R represents an alkyl, haloalkyl, aryl, or haloaryl radical having 1 to 18 carbon atoms, conductive carbon black particles, a stabilizer component, a lubricant component, and a plasticizer and processing aid component.

10 Claims, No Drawings

CONDUCTIVE MOLDING COMPOSITIONS COMPRISING VINYL CHLORIDE-VINYL ETHER COPOLYMERS

This invention relates to conductive molding compositions. More particularly, it relates to conductive molding compositions having excellent processing characteristics from which molded articles having good dimensional stability and thermal stability and other valuable properties can be made.

BACKGROUND OF THE INVENTION

Clemens in U.S. Pat. No. 3,842,194 described a capacitance video disc system in which the disc, which was made of a thermoplastic material that was a vinyl resin, had a conductive metal coating to provide the conductivity required for capacitative pickup and a dielectric material thereover. An electrode on the playback stylus completed the capacitor.

Improvements in this system in which the disc is made from a conductive plastic material have been disclosed. Khanna in U.S. Pat. No. 3,960,790 taught a method of making disc record molding compositions by compounding a vinyl chloride-vinyl acetate copolymer and a vinyl chloride homopolymer with carbon black, a stabilizer, a plasticizer, an antistatic agent, and a mold release agent in a series of blending steps that included successive increases in temperature. In U.S. Pat. No. 4,129,536, Martin et al. disclosed injection molding compositions that comprised a vinyl chloride-propylene copolymer or polyvinyl chloride, a solid mercaptotin stabilizer, an acrylic resin processing aid, and an ester wax lubricant and the use of these compositions in the production of video discs. Molding compositions suitable for use in the compression molding of video discs that contained a vinyl chloride-vinyl acetate copolymer, a vinyl chloride-maleate ester copolymer, a vinyl chloride-propylene copolymer, conductive carbon black particles, polymeric plasticizers and processing aids, two or more metal stabilizers, and three or more lubricants were disclosed by Khanna in U.S. Pat. No. 4,151,132. While the molding compositions of Khanna are readily processable and moldable to form video discs having excellent playback characteristics, they are unsatisfactory because they have a relatively low heat distortion temperature, which results in warpage and shrinkage when the discs are stored at temperatures above 37° C. Molding compositions said to have improved dimensional stability at 54° C., homogeneity, and surface characteristics were disclosed by Martin et al. in U.S. Pat. No. 4,228,050. These compositions comprised polyvinyl chloride or a vinyl chloride—propylene copolymer having a heat distortion temperature of 60° C. or higher, conductive carbon black particles, stabilizers, lubricants, plasticizers, and processing aids, with the proviso that not more than about 5% by weight of liquid additives that are compatible with the vinyl chloride resin are present.

While all of the conductive molding compositions of the prior art can be used to form video discs, none of them meets all of the requirements that have been established for compositions that are to be used in this application, that is, good processability and thermal stability during compound processing and molding, good conductivity, good replication of submicron size surface relief patterns, and dimensional stability on storage under various environmental conditions.

SUMMARY OF THE INVENTION

Conductive molding compositions that have excellent processing characteristics and thermal stability, high distortion temperatures, and other desirable properties comprise a vinyl chloride copolymer containing from 0.1% to 5% by weight of a comonomer that is a vinyl ether having the structural formula

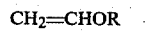

$CH_2{=}CHOR$ wherein R represents an alkyl, haloalkyl, aryl, or haloaryl radical having 1 to 18 carbon atoms, conductive carbon black particles, a stabilizer component, a lubricant component, and a plasticizer and processing aid component.

DETAILED DESCRIPTION OF THE INVENTION

In accordance with this invention, it has been found that conductive molding compositions that meet the requirements that have been established for compositions that are to be used in the production of video discs result when the vinyl chloride homopolymers or vinyl chloride—propylene copolymers that are used in the preparation of the molding compositions disclosed by Martin et al. in U.S. Pat. No. 4,228,050 and by Datta in U.S. Pat. No. 4,275,100 are replaced by a vinyl chloride-vinyl ether copolymer. The conductive molding compositions that contain the vinyl chloride-vinyl ether copolymers are easily-processed materials that are characterized by improved melt viscosity and thermal stability, as compared to those that contain vinyl chloride homopolymers or vinyl chloride—propylene copolymers of the same relative viscosity, and by excellent dimensional stability, homogeneity, and surface characteristics.

The vinyl halide resins that are used in the preparation of the conductive molding compositions of this invention are vinyl chloride copolymers that contain from 0.1% to 5% by weight of a comonomer that is a vinyl ether having the structural formula

$CH_2{=}CHOR$ wherein R represents an alkyl, haloalkyl, aryl, or haloaryl radical having 1 to 18 carbon atoms. Suitable comonomers include methyl vinyl ether, ethyl vinyl ether, isopropyl vinyl ether, tert.butyl vinyl ether, n-hexyl vinyl ether, n-octyl vinyl ether, 2-ethylhexyl vinyl ether, decyl vinyl ether, lauryl vinyl ether, myristyl vinyl ether, cetyl vinyl ether, stearyl vinyl ether, β-chloroethyl vinyl ether, β-iodoethyl vinyl ether, 2,2,2-trichloroethyl vinyl ether, 2-chloropropyl vinyl ether, 3-bromopropyl vinyl ether, phenyl vinyl ether, tolyl vinyl ether, o-chlorophenyl vinyl ether, m-bromophenyl vinyl ether, 2,4-dichlorophenyl vinyl ether, pentachlorphenyl vinyl ether, and the like. One or more of these vinyl ethers may be used in the preparation of the vinyl chloride copolymers. The copolymers preferably contain from 2% to 5% by weight of a comonomer that is an alkyl vinyl ether. These copolymers may be prepared by any of the well-known emulsion or suspension polymerization procedures. For example, they may be prepared by a suspension polymerization process in an aqueous system using a free radical generating polymerization initiator and a suspending agent such as methylcellulose or polyvinyl alcohol.

The vinyl chloride-vinyl ether copolymers may be used alone or in combination with other vinyl halide resins in the conductive molding compositions of this invention.

The conductive carbon black particles, the stabilizer components, the lubricant components, and the plasticizer and processing aid components that are used in the production of the compositions of this invention include those that were disclosed by Martin et al. in U.S. Pat. No. 4,228,050 and by Datta in U.S. Pat. No. 4,275,100, which are incorporated herein by reference.

The carbon black particles that are suitable for use in the products of this invention are highly electrically-conductive, finely-divided carbon blacks that have a low bulk density. A preferred carbon black is Armak Co.'s Ketjenblack EC, which has an apparent bulk density of about 140 to 160 grams per liter and an average particle size of about 300 angstroms. These carbon black particles have a high surface area and a large proportion of voids within the particles, as measured by dibutyl phthalate absorption, which enables current to flow between the conductive particles in a non-conductive polymer matrix in a highly efficient manner. Other carbon blacks can be used instead of or in combination with Ketjenblack EC provided that they meet the electrical requirements.

The amount of conductive carbon black that is used in the molding compositions of this invention is that necessary to reduce their bulk resistivity to less than about 500 ohm-centimeters at 900 megahertz, preferably to less than 100 ohm-centimeters at 900 megahertz. In most cases, the conductive molding compositions contain from 12% to 20% by weight of conductive carbon black particles. They preferably contain from 14% to 16% by weight of conductive carbon black particles.

In addition to the vinyl chloride-vinyl ether copolymer and the conductive carbon black, the conductive molding compositions of this invention contain from 1.5% to 4% by weight of a stabilizer component, from 0.5% to 5% by weight of a lubricant component, and up to 10% by weight of a plasticizer and processing aid component. They preferably contain from 2% to 3% by weight of a stabilizer component, from 1% to 3% by weight of a lubricant component, and up to 6% by weight of a plasticizer and processing aid component. They generally contain not more than 5% by weight of liquid additives and not more than 10% by weight of solid additives.

The stabilizer component of the conductive molding compositions comprises one or more stabilizers that have low volatility at temperatures up to 200° C. Suitable stabilizers include organotin compounds such as dibutyltin mercaptopropionate, dibutyltin maleate, and the like and carboxylates of barium, cadmium, lead, and zinc such as barium stearate, cadmium stearate, lead stearate, zinc stearate, barium 2-ethylhexanoate, zinc 2-ethylhexanoate, and the like and mixtures thereof. Epoxidized vegetable oils, organic phosphates, calcium stearate, and alkylated phenols such as tert.butylcatechol can also be present. The preferred stabilizer components comprise a mixture of organotin compounds, for example, dibutyltin mercaptopropionate and dibutyltin maleate.

The lubricant component contains materials that provide both internal and external lubrication during compounding and molding. It improves the melt flow characteristics of the molding compositions and provides good release of the molded articles from the mold. Useful lubricants include fatty acids, esters of fatty acids and polyfunctional acids, soaps such as calcium stearate, zinc stearate, and lead stearate, and fatty acid amides such as stearamide, oleamide, and ethylene bis stearamide. The lubricant component usually contains at least two lubricants. The preferred lubricants include a mixture of fatty acid esters of varying molecular weight alcohols and acids that is marketed as Loxiol G-30 by Henkel International GmbH, a polyfunctional complex ester of saturated fatty acids that is marketed as Loxiol G-70, esterified montan wax that is marketed as Wax E by Hoechst GmbH, low molecular weight paraffin oils, calcium stearate, and mixtures thereof.

Plasticizers and processing aids are incorporated into the molding compositions to improve their processing and molding characteristics. Suitable plasticizers include chlorinated paraffin waxes, glycerol tribenzoate, phthalate esters, epoxidized soybean oil, and the like. The compositions generally contain one or more processing aids such as vinyl chloride terpolymers and polymethylmethacrylate polymers. The preferred processing aids are the low molecular weight acrylic resins that are available commercially as Acryloid K-125, Acryloid K-147, and Acryloid K-175 from Rohm and Haas Co.

The conductive molding compositions can be prepared by any suitable and convenient procedure by which the carbon black, stabilizer component, lubricant component, and plasticizer and processing aid component can be uniformly dispersed in the vinyl halide resin. For example, they can be prepared by blending the ingredients together in a Henschel mixer or other blender and then mixing the blend under shear in a Banbury mixer, an extruder, or other suitable apparatus to melt it. The molten compositions are sheeted or extruded and then pelletized. Alternatively, the blended material can be metered directly to a screw injection molding apparatus where it is melted, mixed, and molded in one automated operation.

The invention is further illustrated by the following example. In this example, all parts are parts by weight and all percentages are percentages by weight.

EXAMPLES

A. A vinyl chloride copolymer was prepared by heating a polymerization system that contained 125 parts of water, 78 parts of vinyl chloride, 2 parts of ethyl vinyl ether, 25 parts of a 2% solution of hydroxypropylmethylcellulose, 0.1 part of lauroyl peroxide, and 0.8 part of trichloroethylene in a capped bottle at 63° C. for 8 hours. The bottle was vented, and the copolymer was collected, washed with water, and dried in a forced air oven at 45° C. overnight. This copolymer had a relative viscosity of 1.59 and a glass transition temperature of 72° C.

B. This procedure was repeated using different vinyl ethers as comonomers, different amounts of comonomer, and/or different amounts of trichloroethylene to prepare the vinyl chloride copolymers shown in Table I.

Each of these copolymers had a relative viscosity in the range of 1.55 to 1.65 and a glass transition temperature in the range of 68° C. to 84° C.

TABLE I

| Ex. No. | Copolymer | % Comonomer Charged |
|---|---|---|
| B-1 | Vinyl chloride - ethyl vinyl ether | 5.0 |
| B-2 | Vinyl chloride - isobutyl vinyl ether | 2.5 |
| B-3 | Vinyl chloride - isobutyl vinyl ether | 5.0 |
| B-4 | Vinyl chloride - 2-ethylhexyl vinyl ether | 2.5 |
| B-5 | Vinyl chloride - 2-ethylhexyl vinyl ether | 5.0 |
| B-6 | Vinyl chloride - lauryl vinyl ether | 2.5 |
| B-7 | Vinyl chloride - lauryl vinyl ether | 5.0 |
| B-8 | Vinyl chloride - cetyl vinyl ether | 2.5 |
| B-9 | Vinyl chloride - cetyl vinyl ether | 5.0 |

C. Conductive molding compositions were prepared by mixing 75 parts of each of the copolymers described hereinbefore with 15 parts of Ketjenblack EC carbon black, 3 parts of a stabilizer component that contained dibutyltin maleate and dibutyltin mercaptopropionate, 1.5 parts of a lubricant component that contained Loxiol G-30, Loxiol G-70, and calcium stearate, and 5.5 parts of a plasticizer and processing aid component that contained a primary phthalate ester plasticizer (Santicizer 711), Acryloid K-147, and Acryloid K-175 in a Henschel mixer until a homogeneous molten composition was obtained. The mixture was cooled and fed to a plasticating extruder to form a pelletized composition.

For comparative purposes, compositions were prepared in which the vinyl chloride-vinyl ether copolymers were replaced by a vinyl chloride-ethylene copolymer.

D. Sixty parts of each of the conductive molding compositions was worked in a Brabender Plasticorder No. 3 at 190° C. at a rotor speed of either 50 rpm or 100 rpm. When the compositions had fused, samples were removed at 1 minute intervals and observed for color development until degradation had taken place as indicated by the dark amber or brown coloration of the sample. The results obtained are set forth in Table II.

TABLE II

| Ex. No. | Copolymer | Equil. Torque (m/gms/sec) at rotor speed | | Melt Temp. (°C.) at rotor speed | | Heat Stability (minutes) at rotor speed | |
|---|---|---|---|---|---|---|---|
| | | 50 rpm | 100 rpm | 50 rpm | 100 rpm | 50 rpm | 100 rpm |
| D-1 | Prod. of Ex. A | 2350 | — | 198 | — | >24 | — |
| D-2 | Prod. of Ex. B-1 | 2300 | — | 202 | — | >24 | — |
| D-2 | Prod. of Ex. B-4 | 1950 | 1650 | 195 | 207 | >24 | 17.0 |
| D-3 | Prod. of Ex. B-5 | 1900 | — | 192 | — | >24 | — |
| D-4 | Prod. of Ex. B-8 | 2150 | 1650 | 197 | 205 | >24 | 13.8 |
| D-5 | Prod. of Ex. B-9 | 2400 | — | 202 | — | >24 | — |
| D-6 | Prod. of Ex. B-2 | — | 1500 | — | 212 | >24 | 16.5 |
| D-7 | Prod. of Ex. B-3 | — | 1575 | — | 212 | >24 | 17.5 |
| D-8 | Prod. of Ex. B-6 | — | 1600 | — | 206 | >24 | 16.5 |
| D-9 | Prod. of Ex. B-7 | — | 1550 | — | 202 | >24 | 27.5 |
| Comp Ex. | Vinyl chloride- 1% ethylene copolymer | 1900 | 1550 | 195 | 190 | >24 | 14.8 |

What is claimed is:

1. In a conductive molding composition that comprises a vinyl halide resin, sufficient finely-divided conductive carbon black particles that the composition has a bulk resistivity below 500 ohm—cm. at 900 megahertz, a stabilizer component, a lubricant component, and a plasticizer and processing aid component, the improvement wherein the vinyl halide resin is a vinyl chloride-vinyl ether copolymer containing from 0.1% to 5% by weight of a vinyl ether having the structural formula $$CH_2=CHOR$$

wherein R represents an alkyl, haloalkyl, aryl, or haloaryl radical having 1 to 18 carbon atoms.

2. A conductive molding composition as defined in claim 1 wherein the vinyl chloride-vinyl ether copolymer contains from 2% to 5% by weight of said vinyl ether.

3. A conductive molding composition as defined in claim 1 wherein the vinyl halide resin is a copolymer of vinyl chloride and an alkyl vinyl ether.

4. A conductive molding composition as defined in claim 1 wherein the vinyl halide resin is a copolymer of vinyl chloride and ethyl vinyl ether.

5. A conductive molding composition as defined in claim 1 wherein the vinyl halide resin is a copolymer of vinyl chloride and isobutyl vinyl ether.

6. A conductive molding composition as defined in claim 1 wherein the vinyl halide resin is a copolymer of vinyl chloride and 2-ethylhexyl vinyl ether.

7. A conductive molding composition as defined in claim 1 wherein the vinyl halide resin is a copolymer of vinyl chloride and lauryl vinyl ether.

8. A conductive molding composition as defined in claim 1 wherein the vinyl halide resin is a copolymer of vinyl chloride and cetyl vinyl ether.

9. A conductive molding composition as defined in claim 1 that comprises said vinyl chloride-vinyl ether copolymer, 12% to 20% by weight of carbon black particles, 1.5% to 4% by weight of a stabilizer component, 0.5% to 5% by weight of a lubricant component, and up to 10% by weight of a plasticizer and processing aid component.

10. A conductive molding composition as defined in claim 1 that comprises said vinyl chloride-vinyl ether copolymer, 14% to 16% by weight of carbon black particles, 2% to 3% by weight of a stabilizer component, 1% to 3% by weight of a lubricant component, and up to 6% by weight of a plasticizer and processing aid component.

* * * * *